L. J. HIBBARD.
CONTROL SYSTEM.
APPLICATION FILED MAR. 2, 1917.
1,298,712.
Patented Apr. 1, 1919.
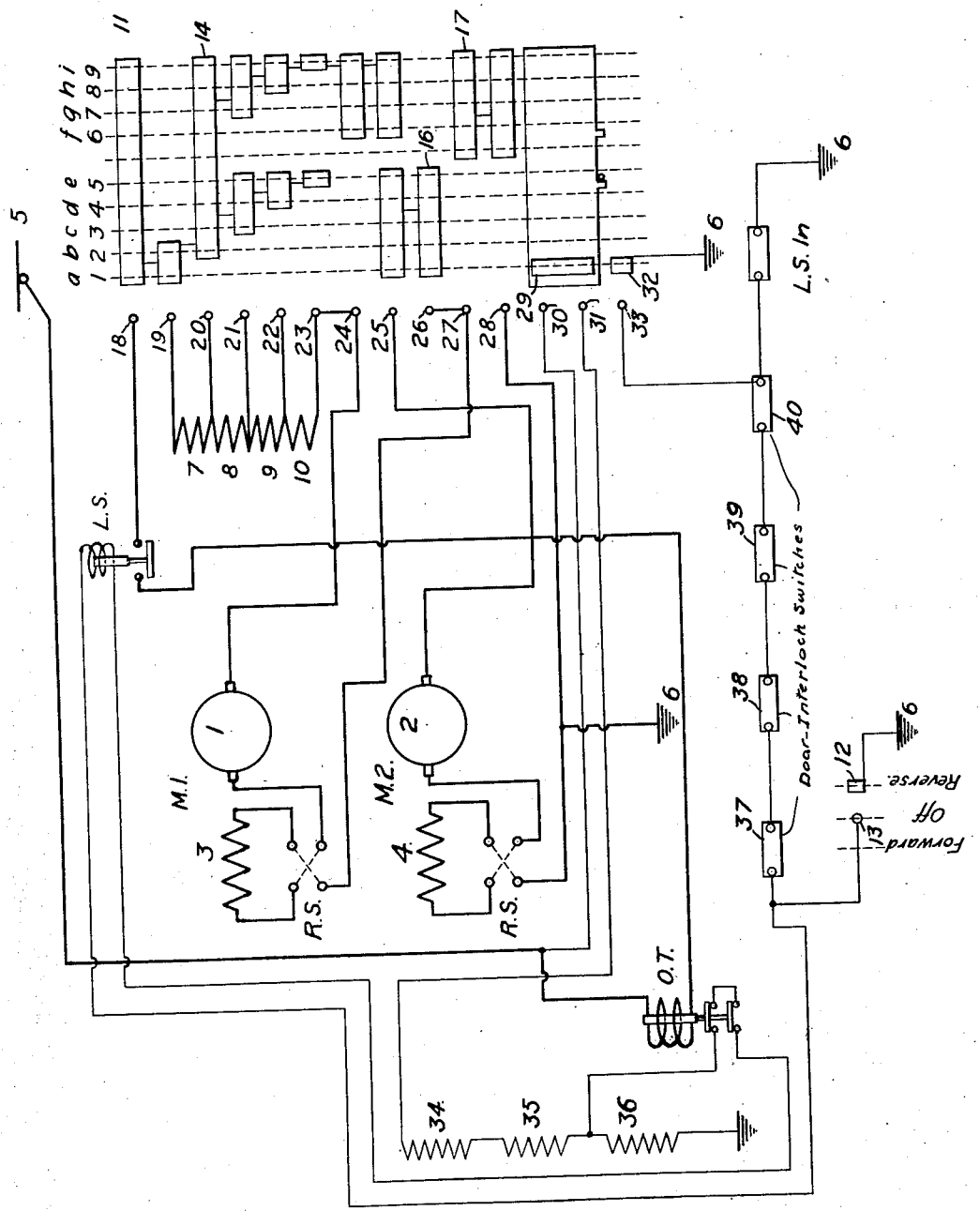
WITNESSES:
Ed Plinke.
Wayne B. Wells.
INVENTOR
Lloyd J. Hibbard.
BY
Wesley G. Carr
ATTORNEY

UNITED STATES PATENT OFFICE.

LLOYD J. HIBBARD, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL SYSTEM.

1,298,712.  Specification of Letters Patent.  Patented Apr. 1, 1919.

Application filed March 2, 1917. Serial No. 151,945.

*To all whom it may concern:*

Be it known that I, LLOYD J. HIBBARD, a citizen of the United States, and a resident of Wilkinsburg, in the county of Allegheny and State of Pennsylvania, have invented a new and useful Improvement in Control Systems, of which the following is a specification.

My invention relates to systems of control and particularly to systems of control for electric-railway vehicles.

One object of my invention is to provide a control system of simplified construction that shall insure the operation, in a reverse direction, of the motors of a railway vehicle in case of an emergency requiring a rapid reversal in the direction of movement of the vehicle.

Another object of my invention is to provide a control system for an electric motor which shall insure the slow operation of a controller in order to accelerate the motor in a forward direction and permit the rapid operation of the controller in order to accelerate the motor in a reverse direction.

More specifically, my invention embodies a control system for an electric motor which is provided with a controller having a contact segment for closing a circuit only in the first position thereof to energize a line switch. The line switch connects the motor across a supply circuit for operating the same in a forward or in a reverse direction. When the line switch is operated in the first position of the controller, a holding circuit is established therefor by means of an interlock switch associated therewith. A contact segment is associated with the motor-reversing switch for insuring the energization of the line switch in any position of the controller when the motor is connected for operation in a reverse direction.

In the prior art, control systems for electric-railway vehicles are disclosed in which it is essential to operate the controller slowly past the first operative position, whether the motors are connected for forward or for reverse operation, in order to insure the operation of the line switch to connect the motors across the supply circuit. Thus, in case the car is moving in a forward direction and it is essential to quickly reverse the direction of rotation of the motors, in order to prevent an accident, the operator of the vehicle may operate his reversing switch and then operate the controller rapidly past the first operative position and prevent the energization of the motor to avoid an accident.

However, in a control system constructed in accordance with my invention, the line switch is energized in any position of the controller to connect the motor across the supply circuit when the motor is connected for operation in a reverse direction.

The single figure of the accompanying drawing is a diagrammatic view of a system of control constructed in accordance with my invention.

Referring to the drawing, two motors $M^1$ and $M^2$, which embody armatures 1 and 2 and field windings 3 and 4, are adapted to be connected in series with the resistors 7, 8, 9 and 10 across a supply circuit comprising a trolley conductor 5 and a ground return conductor 6 by means of a line switch LS and a controller 11. A reversing switch RS, of a familiar and well known construction, is provided for reversing the direction of rotation of the motors, and a contact segment 12, which is associated with the reversing switch, engages a contact finger 13 when the reversing switch is in a reverse position, for a purpose to be described later.

The controller 11 embodies contact segments 14, 16 and 17 which are adapted to engage contact fingers 18 to 28, inclusive, when the controller is moved through positions $a$ to $i$, inclusive, for accelerating the motors in series and in parallel-circuit relation. A slip segment 29 of the type disclosed in the application of N. W. Storer, Serial No. 774,394, filed June 18, 1913, is adapted to engage contact fingers 30 and 31 when the controller is moved in a forward direction and to be disengaged from the contact fingers 30 and 31 when the controller is moved in a reverse direction a predetermined distance. A contact segment 32, which is associated with the controller, is adapted to engage a contact finger 33 in the first operative position of the controller for completing a circuit through the coil of the line switch LS.

An overload trip switch OT having a coil inserted in the circuit of the motors $M^1$ and $M^2$, is provided for preventing an excessive current from passing through the motors at any time during the operation thereof. A plurality of resistors 34, 35 and 36 is connected across the supply conductors 5 and 6, and a circuit comprising the overload trip switch OT, the coil of the line switch LS, door-interlock switches 37, 38, 39 and 40 and the contact segment 32, is connected in shunt to the resistor 36. The line switch LS is provided with an interlock switch LS—in which is adapted to establish a holding circuit for the line switch after the same is operated.

Assuming the reversing switch RS to be set for operating the motors in a forward direction and the door-interlock switches to be closed, the motors are connected across the supply conductors 5 and 6 when the controller 11 is moved to position a. In position a of the controller, a circuit is completed from the trolley conductor 5 through the contact fingers 30 and 31—which are bridged by the slip segment 29—resistors 34 and 35, overload trip switch OT, the coil of the line switch LS, interlock switches 37, 38, 39 and 40, contact finger 33, and the contact segment 32 to the ground conductor 6. Thus, the line switch LS is operated and a circuit is completed through the motors $M^1$ and $M^2$ which may be traced from the trolley conductor 5 through the coil of the overload trip switch OT, line switch LS, contact fingers 18 and 19—which are bridged by the contact segment 14—resistors 7, 8, 9 and 10, motor $M^1$, contact fingers 25 and 26—which are bridged by the contact segment 16—and motor $M^2$ to the ground conductor 6.

In positions b, c, d and e, the resistors 7, 8, 9 and 10 are successively excluded from the circuit of the motors, between positions e and f the transition of the motors from series to parallel-circuit relation is effected in a well-known manner, and, in positions f to i, the motors are accelerated in parallel-circuit relation.

In operating the vehicle in a forward direction, it is essential to move the controller slowly through position a in order to effect operation of the line switch LS and establish a holding circuit for the same, through the interlock switch LS—in.

When the motors $M^1$ and $M^2$ are set for operation in a reverse direction, a circuit is completed through the line switch LS which may be traced from the supply conductor 5 through the contact fingers 30 and 31—which are bridged by the slip segment 29—resistors 34 and 35, overload trip switch OT, coil of the line switch LS, contact finger 13 and the contact segment 12 to the ground conductor 6. Thus, when the motors are connected for operation in a reverse direction, the coil of the line switch is connected directly to the ground conductor through the reversing switch without the interposition of the door-interlock switches and the contact segment 32 of the controller 11, which insures the operation of the line switch LS and the energization of the motors $M^1$ and $M^2$ in any position of the controller 11, regardless of the speed at which the latter is operated.

Modifications in the system and arrangement and location of parts may be made within the spirit and scope of my invention and such modifications are intended to be covered by the appended claims.

I claim as my invention:

1. In a system of control, the combination with a supply circuit, a motor, a controller for governing the operation of the motor, and a line switch for connecting the motor across the supply circuit, of a plurality of independently operable switch segments for preventing the operation of the line switch under predetermined conditions when the motor is connected for operation in a forward direction, and means for establishing a shunt circuit around said switch segments when the motor is connected for operation in a reverse direction.

2. In a system of control, the combination with a motor, and a controller for governing the operation of the motor, of a plurality of unitary switch members for preventing the operation of the motor under predetermined conditions when the motor is connected for operation in a forward direction, and means for establishing a shunt circuit around said switch members when the motor is connected for operation in a reverse direction.

3. In a system of control, the combination with a motor, and a controller for governing the operation of the motor, of means for effecting acceleration of the motor in a forward direction only when the controller is moved slowly past an operative position thereof, and means for insuring the operation of the motor in all positions of the controller when the motor is connected for operation in a reverse direction.

4. In a system of control, the combination with a supply circuit, a motor, and a controller for governing the operation of the motor, of a line switch for connecting the motor across the supply circuit and adapted to prevent the acceleration of the motor when the controller is moved rapidly through its first operative position and the motor is connected for operation in a forward direction, and means for permitting the operation of the line switch in any operative position of the controller when the motor is connected for operation in a reverse direction.

5. In a system of control, the combination with a supply circuit, a motor adapted to be connected across the supply circuit, and a controller for governing the operation of said motor, of a line switch for connecting the motor across the supply circuit, means associated with said controller for establishing an energizing circuit for the line switch when the controller is in the first operative position and the motor is connected for operation in a forward direction, and means for establishing an energizing circuit for the line switch in any position of the controller when the motor is connected for operation in a reverse direction.

6. In a system of control, the combination with a motor, and a controller for governing the operation thereof, of means for preventing the energization of the motor under predetermined conditions when the controller is in an operative position and the motor is connected for operation in a forward direction, and means for insuring the energization of the motor in all positions of the controller when the motor is connected for operation in a reverse direction.

7. In a system of control, the combination with a supply circuit, a motor, and a controller for governing the operation of the motor, of means for connecting the motor across the supply circuit to operate it in a forward direction only when the controller is moved slowly past the first operative position, and means for insuring the connection of the motor across the supply circuit in all positions of the controller when the motor is connected for operation in a reverse direction.

8. In a system of control, the combination with a supply circuit, a motor, a controller for governing the operation of the motor, and a line switch for connecting the motor across the supply circuit, of means for preventing the operation of the line switch under predetermined conditions when the motor is connected for operation in a forward direction, and means for insuring the operation of the line switch in all positions of the controller when the motor is connected for operation in a reverse direction.

9. In a system of control, the combination with a supply circuit, a motor, and a controller for governing the operation of the motor, of means for insuring the connection of the motor across the supply circuit in all positions of the controller when the motor is connected for rotation in a reverse direction, and means for preventing the connection of the motor across the supply circuit under predetermined conditions when the motor is connected for rotation in a forward direction.

10. In a system of control, the combination with a supply circuit, a motor, a controller for governing the operation of the motor, and a line switch for connecting the motor across the supply circuit, of means, comprising a plurality of switch segments and interlock switches, for effecting the operation of the line switch when the controller is in the first operative position and the motor is connected for rotation in a forward direction, an interlock switch associated with the line switch for establishing a holding circuit for the line switch, and a contact segment for insuring the operation of the line switch in any operative position of the controller when the motor is connected for rotation in a reverse direction.

11. In a system of control, the combination with a supply circuit, a motor, a controller for governing the operation of the motor, a reversing switch for reversing the direction of rotation of the motor, and a line switch for connecting the motor across the supply circuit, of a contact segment associated with the controller for establishing an energizing circuit for the line switch in the first position of the controller when the motor is connected for rotation in a forward direction, and a second contact segment associated with the reversing switch for insuring the energization of the line switch in all positions of the controller when the motor is connected for rotation in a reverse direction.

In testimony whereof I have hereunto subscribed my name this 26th day of Feb., 1917.

LLOYD J. HIBBARD.